[19] United States Patent
Gornowicz et al.

[11] Patent Number: 4,563,539
[45] Date of Patent: Jan. 7, 1986

[54] ACRYLOFUNCTIONAL SILICONES

[75] Inventors: Gerald A. Gornowicz; Thomas J. Tangney; Maris J. Ziemelis, all of Midland, Mich.

[73] Assignee: Dow Corning Corporation, Midland, Mich.

[21] Appl. No.: 683,302

[22] Filed: Dec. 18, 1984

[51] Int. Cl.$^3$ .............................. C07F 7/08; C07F 7/10; C07F 7/18
[52] U.S. Cl. ........................................ 556/421; 106/3; 106/287.11; 106/287.13; 106/287.14; 106/287.16
[58] Field of Search ........................................ 556/421

[56] References Cited

U.S. PATENT DOCUMENTS

| | | | |
|---|---|---|---|
| 3,772,351 | 11/1973 | Krahnke | 556/421 |
| 3,856,756 | 12/1974 | Wagner et al. | 556/421 X |
| 3,957,842 | 5/1976 | Proka et al. | 556/421 X |
| 4,316,041 | 2/1982 | Totton et al. | 556/421 X |
| 4,496,210 | 1/1985 | Ansel et al. | 350/96.3 |

*Primary Examiner*—Paul F. Shaver
*Attorney, Agent, or Firm*—Richard E. Rakoczy

[57] ABSTRACT

New acrylofunctional silicones and a method for their synthesis are disclosed. The acrylofunctional silicones are the product of reacting aminoalkyl or diaminoalkyl silicones with isocyanatoacrylates. The acrylofunctional silicones are useful coating materials, and can be cured by ultraviolet radiation.

20 Claims, No Drawings

ACRYLOFUNCTIONAL SILICONES

BACKGROUND OF THE INVENTION

The present invention relates to novel acrylofunctional silicones, and to the method for making them.

Acrylofunctional silicones are useful, easily cured materials, finding use in such diverse areas as optical fiber cladding, paper coating, abrasion resistant coatings for plastics, and other uses. By acrylofunctional silicone it is meant herein a silicone having pendant groups that are conceptual, if not actual, derivatives of acrylic acid, e.g. silicones containing methacrylo groups, ethacrylo groups and the like.

Acrylofunctional silicones have been synthesized by various procedures. For example, they have been synthesized by reacting chloroalkyl substituted silicones with acrylic acid or methacrylic acid. The chloroalkyl substituted silicones themselves are made by special procedures.

Another method of synthesis of acrylofunctional silicones is disclosed in U.S. Pat. No. 4,359,369, issued Nov. 16, 1982 to Takamizawa et al. This patent describes the addition of an acrylo-acid chloride to a mercaptoalkyl substituted polydiorganosiloxane. In this reaction, it is necessary to provide an acid scavenger to eliminate byproduct HCl.

U.S. Pat. No. 4,293,397, issued to Sato et al. Oct. 6, 1981, discloses the addition of a glycidyl acrylate or a glycidyl methacrylate to an amino-terminated diorganopolysiloxane.

U.S. Pat. No. 4,369,300, issued Jan. 18, 1983 to Carter et al. discloses the reaction of a silicone carbinol, a polyisocyanate, and an hydroxyacrylate to produce an acrylofunctional silicone.

Application for U.S. Patent Ser. No. 683,308, entitled "Hydrophilic Silicone-Organic Copolymer Elastomers", applied for by Chi Long Lee, filed of even date with the present application, and assigned to the assignee of the present application, discloses the reaction of isocyanatoethylmethacrylate with polydimethylsiloxanepolyether copolymers.

None of these cited methods is more than superficially similar to the method of the present invention. Moreover, none of these cited methods results in the compositions of the present invention.

SUMMARY OF THE INVENTION

It is an object of the present invention to provide an improved method for the manufacture of acrylofunctional silicone polymers and silanes. It is another object to provide a simple and efficient method to manufacture acrylofunctional silicones. It is still another object to provide novel acrylofunctional silicones of high reactivity.

These and other objects are accomplished by the method of the present invention and the resulting compositions of the present invention.

The method of the present invention involves reacting aminofunctional silicones with isocyanate functional acrylic acid derivatives. The compositions of the present invention are the products of this method.

DETAILED DESCRIPTION OF THE INVENTION

The present invention relates to an acrylofunctional silicone having the average unit formula $$R_a Q_b SiO_{(4-a-b)/2}$$

wherein in said average unit formula

R is selected from monovalent hydrocarbon radicals, halogenated hydrocarbon radicals, and alkoxy radicals;

Q is a monovalent radical selected from the group consisting of —DNHG, and —DNGDNHG radicals, D being a divalent saturated hydrocarbon radical of from 1 to 6 carbon atoms;

G being an acrylofunctional radical of the general formula $$\text{CONHC}_m\text{H}_{2m}\text{OCOC}=\text{CH}_2,$$
$$|$$
$$R'$$

wherein, in the general formula for said acrylofunctional radical, m has a value of 2, 3 or 4;

R' is selected from the group consisting of hydrogen, methyl, ethyl, propyl and butyl radicals;

a has a value of 0, 1, 2 or 3;

b has a value of 0, 1, 2 or 3;

the sum of the values of a and b is from 1 to 4; and there is at least one unit wherein b has a value of 1.

The radical R in the above average unit formula $R_a Q_b SiO_{(4-a-b)/2}$ is a monovalent hydrocarbon radical, halogenated monovalent hydrocarbon radical, or alkoxy radical. By hydrocarbon it is meant herein that the radical is composed of carbon and hydrogen. Thus, when R is a monovalent hydrocarbon radical, it can be an alkyl radical, such as methyl, ethyl, propyl, butyl, dodecyl and the like; an alkenyl radical, such as vinyl, allyl, butenyl and the like; a cycloaliphatic radical, such as cyclohexyl, cycloheptyl and the like; an aryl radical such as phenyl, tolyl, xylyl and the like; or an aralkyl radical such as benzyl, phenylethyl and the like.

The radical R can also be a halogenated hydrocarbon radical, by which it is meant a hydrocarbon radical as defined above with one or more of the hydrogen atoms replaced with a halogen atom, such as fluorine, chlorine, or bromine.

Alkoxy radicals which can be used as the radical R are those alkoxy radicals having from 1 to 7 carbon atoms, e.g., methoxy, ethoxy, propoxy, butoxy, isopropoxy, phenoxy, pentyloxy and the like. When alkoxy radicals are present, it is preferred that they be methoxy radicals. It is further preferred that there be no more than two alkoxy radicals per molecule on average.

It is preferred that most or all of the R radicals be selected from the group consisting of methyl, phenyl, and 3,3,3-trifluoropropyl radicals. More preferably, most or all of the R radicals are methyl radicals.

The radical Q in the average unit formula $R_a Q_b SiO_{(4-a-b)/2}$ is the reaction product of an isocyanato acrylic acid derivative with an aminoalkyl or diaminoalkyl radical which radical is attached to a silicone atom.

The radical Q thus has the formula —DNHG or —DNGDNHG, where D is a saturated divalent hydrocarbon radical and G is an acrylofunctional radical. D contains from 2 to 6 carbon atoms. Thus D can be ethylene, propylene, pentylene, hexylene, cyclohexylene, cyclopentylene, isopropylene, isobutylene and the like. Preferred —D radicals are propylene, ethylene, and isobutylene.

G, the acrylofunctional radical, has the general formula $$-CONHC_mH_{2m}OCOC=CH_2.$$
$$\phantom{-CONHC_mH_{2m}OCOC=} |$$
$$\phantom{-CONHC_mH_{2m}OCOC=} R'$$

The value of m is 2, 3 or 4. R' is selected from the group consisting of hydrogen, methyl, ethyl, propyl, and butyl groups.

Preferred G radicals are those in which m is 2 and R' is methyl, and those in which m is 2 and R' is hydrogen.

The values of each a and each b in the average unit formula $R_aQ_bSiO_{(4-a-b)/2}$ are 0,1,2 or 3 with the proviso that the sum of values of a plus b be from 1 to 4 and that there be at least one unit per molecule where b has a value of 1 or more.

When the sum of the values of a and b is 4, then a silane results, said silane having the formula $R_aQ_bSi$. Examples of suitable silanes are $CH_3QSi(OCH_3)_2$; $(CH_3)_3SiQ$; $(C_2H_5)_2SiQ_2$ and the like.

More preferably, the sum of the values of a and b is, on average, from 1.8 to 2.7. A material with such a formula is substantially linear, and is termed herein a polydiorganosiloxane.

Polydiorganosiloxane compositions of the present invention have the formula $$R''R_2SiO(R_2SiO)_x(RQSiO)_ySiR_2R'',$$

wherein R and Q radicals have their previously assigned meaning.

R" in the above formula for a polydiorganosiloxane composition of the present invention is selected from R radicals, Q radicals, and hydroxyl radicals. The values of x in the above formula is from 0 to 10,000; the value of y in the above formula is from 1 to 1000. Thus the polydiorganosiloxane compositions of the present invention can vary from a freely flowing liquid to a viscous gum.

The compositions of the present invention are made by the method of the present invention, said method comprising (1) mixing together in the substantial absence of water:

(A) a silicone having the average unit formula:

$$R_aE_bSiO_{(4-a-b)/2}$$

wherein in said average unit formula

R is selected from monovalent hydrocarbon radicals, halogenated hydrocarbon radicals; and alkoxy radicals;

E is selected from the group consisting of $-DNH_2$, and $-DNHDNH_2$ radicals,

D being a divalent hydrocarbon radical of from 1 to 6 carbon atom, a has a value of 0, 1, 2, or 3;

b has a value of 1, 2, or 3;

and the sum of the values of a and b is from 1 to 4, and (B) an isocyanatoacrylate having the general formula $$OCNC_mH_{2m}OCOC=CH_2,$$
$$\phantom{OCNC_mH_{2m}OCOC=} |$$
$$\phantom{OCNC_mH_{2m}OCOC=} R'$$

wherein in
said general formula
m has a value of 2, 3, or 4; and

R' is selected from the group consisting of hydrogen, methyl, ethyl, propyl, and butyl radicals; and (2) isolating the resulting acrylofunctional silicone.

R, a and b in the above formula for the silicone component (A) all have the meaning assigned above under the discussion of the acrylofunctional silicone.

The radical E is selected from the group consisting of $DNH_2$, and $DNHDNH_2$ radicals, wherein D is a divalent, unsaturated hydrocarbon radical as described above under the discussion of the acrylofunctional silicone. Thus, E is selected from aminoalkyl radicals and diaminoalkyl radicals.

Silicones containing aminoalkyl radicals and diaminoalkyl radicals are well known and many are available commercially. Alternatively, such silicones can be synthesized by hydrolysis and condensation of silanes containing appropriate aminoalkyl or diaminoalkyl radicals, and also containing hydrolyzable radicals. Examples of suitable hydrolyzable radicals include alkoxy radicals, such as methoxy, ethoxy or butoxy. Silanes having R radicals as hereinabove described and hydrolyzable radicals can also be included in the hydrolysis and condensation to synthesize component (A) of the compositions of the present invention. Other methods of synthesis are known to those skilled in the art of organosilicon chemistry.

Silanes substituted with such E radicals, R radicals, and hydrolyzable are well known and available.

Exemplary of aminoalkyl and diaminoalkyl radicals suitable for use as E radicals in the method of the present invention are $-CH_2CH_2NH_2$; $-CH(CH_3)CH_2NH_2$; $-CH_2CH(CH_3)CH_2NH_2$; $-CH_2CH(CH_3)CH_2NHCH_2CH_2NH_2$; $CH_2CH_2CH_2NHCH_2CH_2NH_2$; and others.

The isocyanotoacrylate used in the method of the present invention has the general formula $$OCNC_mH_{2m}OCOC=CH_2,$$
$$\phantom{OCNC_mH_{2m}OCOC=} |$$
$$\phantom{OCNC_mH_{2m}OCOC=} R'$$

wherein m has the value of 2, 3 or 4, and R' is selected from hydrogen, methyl, ethyl, propyl and butyl radicals.

Exemplary of isocyanatoacrylates useful in the method of the present invention are $$OCNC_2H_4OCOC=CH_2; \quad OCNC_3H_6OCOC=CH_2;$$
$$\phantom{OCNC_2H_4OCOC=} | \phantom{H_2; \quad OCNC_3H_6OCOC=} |$$
$$\phantom{OCNC_2H_4OCOC=} CH_3 \phantom{H_2; \quad OCNC_3H_6OCOC=} H$$

$$OCNC_2H_4OCOC=CH_2; \quad OCNC_2H_4OCOC=CH_2;$$
$$\phantom{OCNC_2H_4OCOC=} | \phantom{H_2; \quad OCNC_2H_4OCOC=} |$$
$$\phantom{OCNC_2H_4OCOC=} H \phantom{H_2; \quad OCNC_2H_4OCOC=} C_2H_5$$

and the like.

Some suitable isocyanatoacrylates are commercially available. For example, isocyanatoethylmethacrylate is commercially available. Other isocyanatoacrylates can be synthesized by known methods. For example, isocyanatoacrylates can be synthesized by reacting a suitably selected acrylate or alkacrylate-substituted oxazoline derivative with phosgene in the presence of an HCl scavenger.

As the first step of the method of the present invention, the silicone component (A) and the isocyanatoacrylate component (B) are mixed together in the substantial absence of water. By one term substantial absence of water it is meant herein, no more than a trace, e.g. 100 to 1000 parts by weight of water per million parts by weight of reactants.

By the term mixed together it is meant herein mechanically manipulated such that the respective components form a visibly homogeneous mixture.

Such mixing can be accomplished by a variety of well known operations. For example, each of the components can be loaded into a vessel equipped with a mechanical stirrer, or each of the components can be simultaneously pumped through a section of tubing which contains a static mixer. Mixing is accomplished with water substantially excluded from the vessel, tubing, or other means of confining the two components.

In cases where the silicone component (A) has a relatively high molecular weight, it may be more convenient to first dissolve the component (A) in a suitable solvent before the mixing step.

Examples of suitable solvents include toluene, xylene, heptane, hexane, and other solvents for aminoalkyl or diaminoalkyl substituted silicones. Of course solvents which are known, or are subsequently discovered, to react with either the silicone or the isocyanatoacrylate, are to be avoided. Solvents containing reactive hydrogen groups, such as alcohols or organic acids, are to be avoided.

Step 2 of the method of the present invention, the isolation step, is accomplished simply by removing the product from the vessel, as in the case where step 1 is performed in a vessel, or allowing the product to be pumped to a receiver in the case of performing step 1 in a section of tubing.

If a solvent is used to facilitate step 1, then a stripping step, whereby the product is isolated by volatilizing and removing the solvent, may be preferred. In certain applications it may be desirable to keep the product in solvent for subsequent use.

Approximately equal quantities, on a molar basis, of isocyanate group and amino group are used in the method of the present invention. For example, equal quantities $\pm 20\%$ on a molar basis are used.

The compositions of the present invention are useful in the general field of coating.

For example, the compositions of the present invention are useful paper coatings that are readily cured either by means of free radical generators or by exposure of the composition to suitable radiant energy, such as electron beams or ultraviolet radiation.

The compositions of the present invention can be cured by means of free radical generators. For example, 100 parts be weight of the compositions of the present invention are mixed with from 0.01 to 10 parts by weight of a free radical generator to form a curable coating composition. Free radical generators are materials which decompose upon heating to form free radicals which subsequently react with the compositions of the present invention. Examples of suitable free radical generators include, but are not limited to, certain azo compounds, such as azo-bis-isobutyronitrile, 2,t-butylazo-2-cyanopropane; organic peroxides such as 2,5-dimethyl-butylperoxyhexane, benzoyl peroxide, dichlorobenzoyl peroxide; and other known free radical generators.

The compositions of the present invention can also be cured by means of exposure of radiant energy. For example, the compositions of the present invention can be cured by exposure to electron beams or to ultraviolet radiation. In the case of exposure to ultraviolet radiation, it is preferred to add to each 100 parts by weight of compositions of the present invention, from 0.001 to 8 parts by weight of a photosensitizer or photoinitiator. Examples of photosensitizers and photoinitiators include benzoin derivatives, such as benzoin ethyl ether, and benzophenone derivatives, such as benzophenone or diethoxyacetophenone. Other suitable photosensitizers and photoinitiators will be known to those skilled in the art.

The compositions of the present invention can be used as coatings per se, or they can be used mixed with other components. For example, the compositions of the present invention can be mixed with polyacrylates in major or minor proportions to modify the polyacrylate. The compositions of the present invention are believed to be useful additives for automotive polishes.

When the compositions of the present invention are used as coating compositions per se, they can be applied to a substrate by any of several well known coating techniques. For example, they can be applied by flow coating, curtain coating, spraying, doctoring, dipping, extrusion, and the like. In the case of compositions of the present invention having relatively high viscosities, such as polydiorganosiloxanes wherein the sum of x and y approaches 10,000, it may be preferred to dissolve from 0.5% to 70% by weight of such a polydiorganosiloxane in a suitable solvent. Suitable solvents are those described as suitable solvents for component (A).

Substrates upon which the compositions of the present invention can be coated include, but are not limited to, cellulosic substrates, such as paper, boxboard and wood; mineral and mineral derivative substrates, such as stone, concrete, glass, and the like; metal substrates, such as aluminum, steel and the like; plastic substrates, such as polyacrylates, polyolefins, polyesters and the like; and other substrates.

The following Examples of making and using the compositions of the present invention are here included. These Examples are not to be construed as limiting the scope of the claims.

Parts and percentages in the Examples are by weight unless otherwise indicated. The term Me represents the methyl radical in the following Examples.

EXAMPLE 1

A three-necked flask, equipped with a stirrer, thermometer and condenser, was charged with 250.0 g of a silicone component (A) having the average formula:

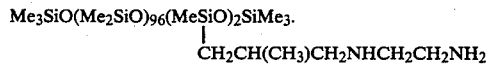

This provided 0.14 moles of NH. The flask was further charged with 21.7 g of an isocyanatoacrylate component (B) having the formula

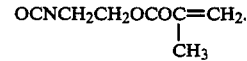

This provided 0.14 moles of the isocyanato group.

The above components (A) and (B) were then mixed, by stirring, under a nitrogen purge. The temperature of the mixed reactants rose from 22° C. to 55° C. The reaction mixture was then heated to a temperature of about 77° C., which temperature was maintained for 2.5 hours. The product was then isolated by simply pouring into another vessel. This product was a slightly yellow fluid having a viscosity of 12,600 centipoise at 25° C. Infrared spectroscopic analysis of the product confirmed essentially complete reaction by the disappearance of the signal attributable to the isocyanate group.

EXAMPLE 2

Five grams of the product of Example 1 were mixed with a few drops of 2-t-butylazo-2-cyanopropane (Luazo 79, a product of the Lucidol Division of the Pennwalt Corporation of Buffalo N.Y.). This mixture was heated to a temperature of about 105° C. for a few minutes. The mixture rapidly cured, forming a fairly dry, tight gel.

EXAMPLE 3

To 100 parts of the product of Example 1 were added 3 parts of diethoxyacetophenone. The resulting mixture was coated upon several aluminum test panels at thicknesses of 0.005 cm (0.002 inches). The test panels were then exposed to ultraviolet radiation by being passed through an Ashdee Model UV 8000-24 curing unit, available form Canrad-Hanovia Corp., Newark, N.J., supplied with two ultraviolet lamps, each operating at 10 amps. Individual panels were passed through said unit at the speeds listed in Table 1, thus being exposed to the amounts of radiation listed in Table 1. The results of this irradiation are found in Table 2.

In Table 2, the recorded observations have the following meanings:

Thickened: The coating increased visibly in viscosity.
Slight cure: The coating film became immobile, but was wet.
Cure: The coating became immobile, but was somewhat wet.
Good Cure: The coating became immobile and was substantially dry.

TABLE 1

| Line Speed vs. Radiation Amount | |
|---|---|
| Line Speed ft/min | Radiation Amount J/m$^2$ |
| 30 | $1.5 \times 10^{-3}$ |
| 60 | $3.0 \times 10^{-3}$ |
| 100 | $5.0 \times 10^{-3}$ |
| 140 | $7.0 \times 10^{-3}$ |

EXAMPLES 4–6

The procedure of Example 3 was repeated with benzophenone, benzoin ethyl ether, and with no added photosensitizer. The results are found in Table 2.

TABLE 2

| | State of Cure vs. Line Speed | | | |
|---|---|---|---|---|
| | | Line Speed ft/min | | |
| Example | Photosensitizer | 30 | 60 | 100 | 140 |
| 3 | diethoxy-acetophenone | good cure | good cure | cure | cure |
| 4 | benzophenone | slight cure | slight cure | slight cure | thickened |
| 5 | benzoin ethyl ether | good cure | — | good cure | cure |
| 6 | none | slight cure | slight cure | thickened | thickened |

That which is claimed is:

1. An acrylofunctional silicone having the average unit formula $$R_aQ_bSiO_{4-a-b/2}$$

wherein in said average unit formula
R is selected from monovalent hydrocarbon radicals, halogenated hydrocarbon radicals, and alkoxy radicals;
Q is a monovalent radical selected from the group consisting of —DNHG, and —DNGDNHG, radicals,
D being a divalent saturated hydrocarbon radical of from 1 to 6 carbon atoms;
G being an acrylofunctional radical of the general formula $$-CONHC_mH_{2m}OCOC=CH_2,$$
$$\phantom{-CONHC_mH_{2m}OCOC=C}|$$
$$\phantom{-CONHC_mH_{2m}OCOC=}R'$$

wherein, in the general formula for said acrylofunctional radical,
m has a value of 2, 3 or 4;
R' is selected from the group consisting of hydrogen, methyl, ethyl, propyl and butyl radicals;
a has a value of 0,1,2 or 3;
b has a value of 0,1,2 or 3;
the sum of the values of a and b is from 1 to 4; and there is at least one unit wherein b has a value of 1.

2. An acrylofunctional silicone as claimed in claim 1 having the general formula $$R''R_2SiO(R_2SiO)_x(RQSiO)_ySiR_2'R''$$

wherein
R'' is selected from hydroxyl radicals, R radicals and Q radicals;
x has a value of from 0 to 10,000; and
y has a value of from 1 to 1000.

3. An acrylofunctional silicone as claimed in claim 2 wherein R is the methyl radical.

4. An acrylofunctional silicone as claimed in claim 3 wherein Q is the —DNHG radical.

5. An acrylofunctional silicone as claimed in claim 4 wherein m has a value of 2 and R' is the ethyl radical.

6. An acrylofunctional silicone as claimed in claim 4 wherein m has a value of 2 and R' is the hydrogen radical.

7. An acrylofunctional silicone as claimed in claim 3 wherein Q is the DNGDNHG radical.

8. An acrylofunctional silicone as claimed in claim 7 wherein m has a value of 2 and R' is the methyl radical.

9. An acrylofunctional silicone as claimed in claim 7 wherein m has a value of 2 and R' is the hydrogen radical.

10. An acrylofunctional silicone as claimed in claim 1 having the formula $R_aQ_bSi$, wherein a has a value of 0, 1, 2, or 3, b has a value of 1, 2, 3, or 4 and the sum of the values of a and b is 4.

11. A method for producing acrylofunctional silicones, said method comprising
(1) mixing together in the substantial absence of water:
(A) a silicone having the average unit formula $R_aE_bSiO_{4-a-b/2}$ wherein in said average unit
R is a monovalent hydrocarbon halogenated hydrocarbon radical or alkoxy radical; and
E is selected from the group consisting of —DNH$_2$, and —DNHDNH$_2$, radicals D being a divalent hydrocarbon radical of from 1 to 6 carbon atom
a has a value of 0, 1, 2, or 3;

b has a value of 1, 2, or 3;
and the sum of the values of a and b is from 1 to 4, and (B) an isocyanatoacrylate having the general formula

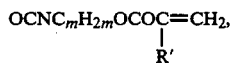

wherein in said general formula
m has a value of 2, 3, or 4; and
R' is selected from the group consisting of hydrogen, methyl, ethyl, propyl, and butyl radicals; and (2) isolating the resulting acrylofunctional silicone.

12. A method as claimed in claim 11 wherein component A has the general formula

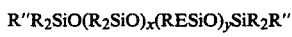

wherein

R'' is selected from hydroxyl radicals, R radicals and Q radicals;
x has a value of from 0 to 10,000; and
y has a value of from 1 to 1000.

13. A method as claimed in claim 12 wherein R is the methyl radical.

14. A method as claimed in claim 13 wherein E is the —DNH$_2$ radical.

15. A method as claimed in claim 14 wherein m has a value of 2 to R' is the ethyl radical.

16. A method as claimed in claim 14 wherein m has a value of 2 and R' is the hydrogen radical.

17. A method as claimed in claim 13 wherein E is the —DNHDNH$_2$ radical.

18. A method as claimed in claim 17 wherein m has a value of 2 and R' is the ethyl radical.

19. A method as claimed in claim 17 wherein m has a value of 2 and R' is the hydrogen radical.

20. A method as claimed in claim 11 wherein a has a value of 0, 1, 2, or 3, b has a value of 1, 2, 3, or 4 and the sum of the values of a and b is 4.

* * * * *